United States Patent [19]
Scherer

[11] 3,860,468
[45] Jan. 14, 1975

[54] ANGULAR WELDING PROCESS AND APPARATUS

[75] Inventor: Richard A. Scherer, Geneva-Cointrin, Switzerland

[73] Assignee: E. I. du Pont de Nemours and Company, Wilmington, Del.

[22] Filed: Apr. 10, 1973

[21] Appl. No.: 349,708

[52] U.S. Cl. ............... 156/73.5, 29/470.3, 156/304, 156/582, 228/2
[51] Int. Cl. ........................................... B32b 31/16
[58] Field of Search ............. 156/73, 158, 502, 556, 156/582, 304; 29/470.3; 228/1, 2; 264/68

[56] References Cited
UNITED STATES PATENTS

| | | | |
|---|---|---|---|
| 2,956,611 | 10/1960 | Jendrisak et al. | 156/73 |
| 3,002,871 | 10/1961 | Tramm et al. | 228/2 X |
| 3,002,871 | 10/1961 | Tramm et al. | 156/158 X |
| 3,058,513 | 10/1962 | Schaub et al. | 156/502 |
| 3,062,695 | 11/1962 | Hull | 156/556 X |
| 3,614,828 | 10/1971 | Maurya et al. | 228/2 X |
| 3,701,708 | 10/1972 | Brown et al. | 156/582 |
| 3,720,993 | 3/1973 | Farmer et al. | 156/73 X |
| 3,732,613 | 5/1973 | Steigerwald | 156/73 X |
| 3,765,973 | 10/1973 | Kramer | 156/73 |

*Primary Examiner*—Edward G. Whitby

[57] ABSTRACT

Method of friction welding two thermoplastic parts together in predetermined alignment with each other which comprises cyclicly moving the parts relative to one another thereby setting up a relative vibration between the two parts, whereby opposing forces are substantially equal while pressing the two parts into surface contact with each other for a time sufficient to melt the contacting surfaces by frictionally induced heat, stopping the relative vibration with the parts in predetermined alignment, and holding the parts in predetermined alignment with said surfaces pressed into contact with each other until the melted thermoplastic resin hardens.

13 Claims, 6 Drawing Figures

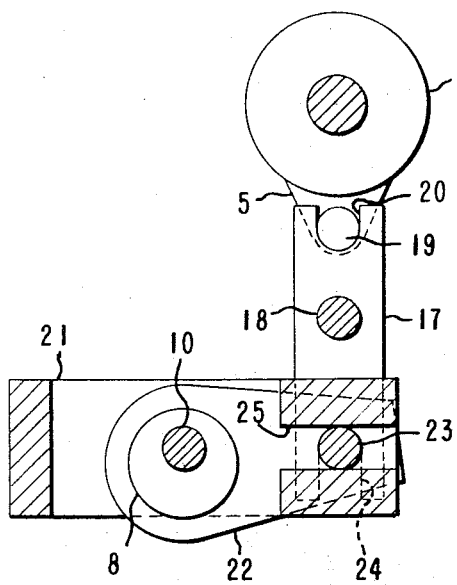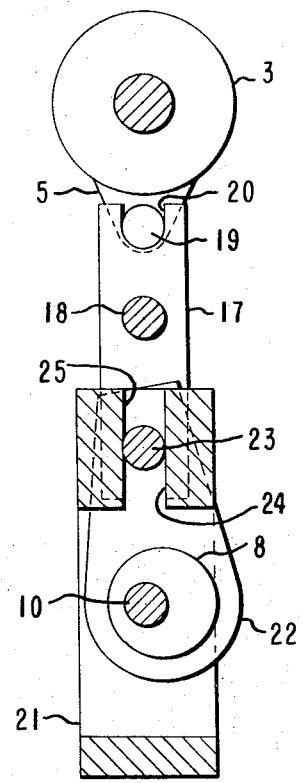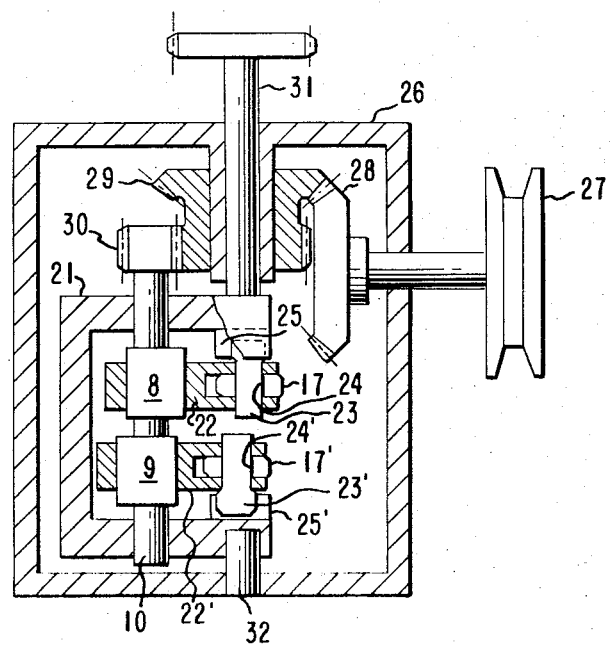

ANGULAR WELDING PROCESS AND APPARATUS

BACKGROUND OF THE INVENTION

1. Field of the Invention

This invention relates to friction welding thermoplastic resin parts in predetermined alignment and to apparatus therefor.

2. Description of the Prior Art

A number of methods of welding thermosplastic resin parts are known involve heating the surfaces of the parts to be joined. One such method of welding is by ultrasonic heating. Another such method is friction welding in which heat is generated by rotating at least one part in frictional contact with the other, for example, by the well-known spin-welding process. Another such method is by the hot plate welding method.

Friction welding is most commonly carried out by spin welding in which two circular pieces are welded together by holding one piece stationary and spinning the other piece while in contact with the stationary piece until a weld is achieved as fully described, for example, in Welding of Plastics by Neumann and Bockhoff (1959) Reinhold Publishing Corp., N.Y., Chapter 6, Pages 99 to 109. Variations of the basic spin welding process have been described in the prior art. For example, U.S. Pat. No. 2,956,611 teaches spin welding in which both pieces are rotated in opposite directions. In U.S. Pat. No. 3,701,708 an orbital motion is used. In U.S. Pat. Nos. 3,002,871; 3,058,513 and 3,062,695 one of the pieces is moved in a rotary oscillating or reciprocating motion.

SUMMARY OF THE INVENTION

In accordance with the present invention a method of friction welding two thermoplastic resin parts together in predetermined alignment with each other is provided which comprises cyclicly moving the parts relative to one another, thereby setting up a relative vibration between the two parts whereby opposing forces are substantially equal while pressing the two parts into surface contact with each other for a time sufficient to melt the contacting surfaces by frictionally induced heat, stopping the relative vibration with the parts in predetermined alignment, and holding the parts in predetermined alignment with said surfaces pressed into contact with each other until the melted thermoplastic resin hardens.

According to another aspect of the invention, there is provided apparatus for friction welding thermoplastic parts, such apparatus comprising a pair of jaws for holding the parts to be welded, means for urging the jaws towards one another to press the parts into surface contact with one another, means for vibrating both jaws holding said parts relative to one another in a plane parallel to the surfaces of said parts, and means for stopping the relative vibration with the parts in predetermined alignment.

BRIEF DESCRIPTION OF THE DRAWINGS

FIG. 4 is a schematic end elevation partly in section of a further embodiment of apparatus for carrying out the method of this invention in the welding position.

FIG. 5 is a schematic end elevation partly in section of the embodiment of the apparatus of FIG. 4 in the predetermined aligned position.

FIG. 6 is a schematic side elevation partly in section of the embodiment of apparatus partly shown in FIG. 4.

DETAILED DESCRIPTION OF THE INVENTION

Figure 1:
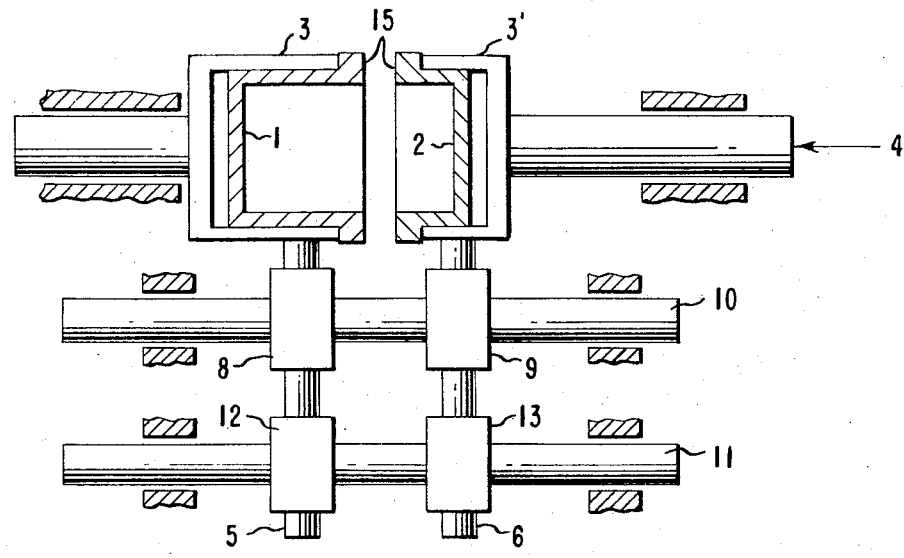
FIG. 1 is a schematic side elevation partly in section of an embodiment of apparatus for carrying out the method of the invention.

The vibration used to weld thermoplastic parts in accordance with this invention may be a simple linear displacement or it may be an angular displacement of small dimensions. The linear or angular vibration of each part may be at a frequency of the order of 100 cycles per second or more. Frequencies of about 90 cycles per second give a good combination of machine life and welding efficiency.

One of the principle features of the present invention is that both parts to be welded are in motion. It has been found that a truly unexpected result is accomplished by setting up a relative vibration in which both parts are vibrating. When it was tried to produce a weld by having one piece stationary and the other piece vibrating at twice or more than twice the normal rate used in accordance with this invention, for example, at 200, or 400 cycles per second rather than 100 cycles per second, a longer weld time is experienced and the weld is not as satisfactory; that is, it has poorer mechanical strength and leaks due to an incomplete bond. Moreover, when only part is in motion, severe vibrations are set up within the machine which places a severe strain on the longevity of the machine and its parts.

Another important feature of the present invention is that, during vibration of the two parts, opposing forces are substantially equal, that is, the momentum of the total mass moving in one direction is at any given time substantially equal to the momentum of the total mass moving in the other direction. This may be accomplished by having the mass of both jaws and both thermoplastic resin pieces substantially equal. Where the masses of the two thermoplastic resin pieces are not substantially equal, the masses of the two jaws may be adjusted so that the total mass of one jaw and its corresponding piece is substantially equal to the total mass of the other jaw and the other piece. As long as opposing forces are balanced in this manner, there will be no substantial vibrational effect on the machine as a whole. This is important in terms of wear and tear on the machine.

In one embodiment, the two parts are clamped in axially aligned jaws which are urged toward one another, and the jaws are subjected to a small alternating angular vibration of small angular displacement, e.g., of the order of about 1°–2°, although vibrations of greater angular displacement, e.g., about 10° and above may be employed. Smaller angles of displacement require higher vibration frequencies. Generally, the angle of displacement is chosen so that the weld surface of each part will travel about 1 to 4 millimeters during each half-cycle of its vibration. The angular vibration may be provided by two operating cams acting on arms extending radially from the two jaws, the two operating cams being offset with respect to one another, preferably by 180°. A stopping arrangement is provided in the form of two further cams which are capable of lifting the arms away from their operating cams so that the latter cannot make contact therewith. A preferred stopping arrangement is provided by mounting a drive shaft containing operating cams in a pivotable frame. Upon pivoting the frame, the jaw is idled in the predetermined aligned position because the operating cams cannot impart motion to the jaws.

In order that the invention may more readily be understood, the following description is given, merely by way of example, reference being made to the accompanying drawings.

Referring first to FIG. 1, it will be seen that the two parts 1 and 2 to be welded are held in two jaws 3 and 3', which are rotatable about a common axis and are axially movable relative to one another to enable the two parts to be inserted and subsequently removed from the jaws and to permit urging of the two parts together as indicated by the arrow 4.

Depending from the jaws 3 and 3' are arms 5 and 6 respectively, which extend substantially radially of the jaws. These arms are each urged by a spring 7 (one shown) into contact with respective operating cams 8 and 9, the two cams being simple eccentrics arranged 180° with respect to one another on a cam shaft 10.

A further cam shaft 11 below and to one side of the cam shaft 10 has a pair of cams 12 and 13, the throw of these two cams being greater than the throw of the operating cams 8 and 9.

Figure 2:
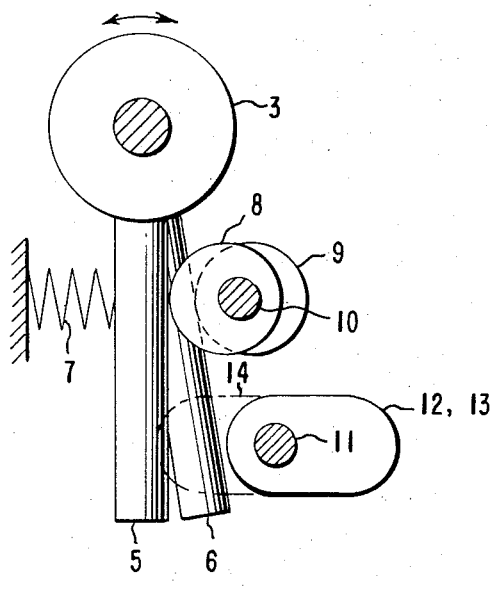
FIG. 2 is an end elevation partly in section of the apparatus of FIG. 1.

In use of the described apparatus, cams 12 and 13 are rotated to the dotted line position indicated by 14 in FIG. 2. The two parts 1 and 2 are aligned and clamped in their respective jaws 3 and 3'. The jaws are then closed and the force applied as indicated at 4. The pressure at the surfaces to be welded generated by force 4 will normally be of the order of about 15 to 35 kg./sq. cm. of surface to be welded. Cams 12 and 13 are rotated on cam shaft 11 to the full line position shown on FIG. 2 thereby permitting cams 8 and 9 to engage arms 5 and 6 respectively. With the cam shaft 10 rotating, an angular vibration is set up with the two jaws 3 and 3' operating or travelling in opposite directions because of the relative disposition of the cams 8 and 9 on the cam shaft 10. The force 4 urges the mating surfaces 15 of the two parts 1 and 2 together and the surfaces soon become melted due to the heat caused by the friction set up between the two parts.

After a sufficient time has elapsed to bring parts 1 and 2 to welding temperature, the cam shaft 11 is rotated so that the cams 12 and 13 leave the full line position indicated in FIG. 2 and take up the dotted line position indicated by 14. In this position the two arms 5 and 6 are forced away from the cams 8 and 9 so as not to make contact therewith and jaws 3 and 3', hence parts 1 and 2 are returned to the angle of orientation they were in before welding was initiated. Thus, the parts are welded at high accuracy and always the same position. Furthermore, the cam shaft 10 can rotate constantly and it is only necessary to turn the cam shaft 11 to the position where the cams 12 and 13 take up the position indicated at 14 when it is desired to insert or remove the parts.

Figure 3:
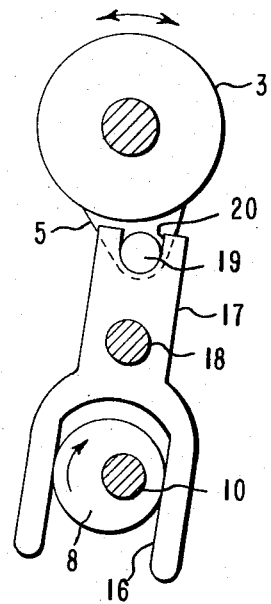
FIG. 3 is a schematic end elevation partly in section of a further embodiment of apparatus for carrying out the method of this invention.

FIGS. 3 and 4 illustrate further embodiments that operate on the same basic principle as the apparatus illustrated in FIGS. 1 and 2. Referring to FIG. 3 cam 8 is rotatably mounted in yoke 16 of a rocker 17 thus providing a positive drive mechanism (i.e., the need for spring 7 as shown in FIG. 2 is eliminated). In this case, rocker 17 pivots about pin 18 and transfers vibrational motion to jaw 3 via pin 19 that rides on yoke 20. Pin 19 is mounted on arm 5 that is fastened to jaw 3. Jaw 3', arm 6 and cam 9 (not shown) operate in the manner just described the only difference being that cam 9 is offset 180° with respect to cam 8. Cams 12 and 13 are replaced in the apparatus of FIG. 3 by e.g., a hydraulic or pneumatic clutch (not shown) that stop cam shaft 10 when parts 1 and 2 have reached welding temperature and are in the proper orientation for welding.

In FIG. 4, which illustrates a preferred embodiment, cam shaft 10 is mounted in frame 21 and rotates therein. Arm 5, hence jaw 3 is again driven by cam 8 which is fixed to cam shaft 10, but in this instance cam 8 is rotatably mounted in lever 22. Motion from cam 8 is transmitted to rocker 17 via pin 23 that is mounted on lever 22 with pin 23 riding in yoke 24 of rocker 17 and in slot 25 of frame 21. The axis of slot 25 passes through the center line of cam shaft 10. Slot 25 enables a reciprocating motion to be imparted to pin 23 in reference to frame 21 and with frame 21 in the position in FIG. 4, causes rocker 17 to be rotated about pin 18 to its maximum extent. Parts 10, 18, 19, 20, 5 and 17 are the same as in FIG. 3. After parts 1 and 2 reach welding temperature, frame 21 together with cam shaft 10, cam 8, lever 22 and slot 25 are pivoted 90° so that frame 21, cam shaft 10, cam 8, lever 22, and slot 25 are in the position shown in FIG. 5. In this new position jaw 3 is idled with parts 1 and 2 in the predetermined aligned position because slot 25 is now parallel to the axis of yoke 24 and pin 23 merely reciprocates along the now common axis of slot 25 and yoke 24. Here again jaw 3', arm 6, cam 9, lever 22', pin 23', yoke 24', slot 25', and rocker 17' operate in the same manner, with cam 9 being offset 180° with respect to cam 8 (as shown in FIG. 6).

As in the case of the apparatus of FIGS. 1 and 2, the devices of FIGS. 3, 4 and 5 return jaws 3 and 3' to the position they were in before welding was begun. Therefore, parts 1 and 2 are mounted in jaws 3 and 3' so that their initial angular orientation relative to each other is the same as it is to be after welding is completed.

One means by which the apparatus can operate is shown in FIG. 6. The operating mechanism is enclosed in a casing 26. A drive pulley 27 through suitable gears 28, 29 and 30 rotates cam shaft 10 which has mounted thereon cams 8 and 9. Frame 21 in which cam shaft 10 is mounted rotates about the axis of shaft 31 and pivot 32 by suitable means, e.g., a pinion driven by a pneumatically operated rack (not shown). The effect of the rotation of Frame 21 has been explained above in the description of FIGS. 4 and 5.

It will be appreciated that besides circular parts, in which case the abutting surfaces 15 are designed for normal spin welding, any other shapes can be welded. It is important that the surfaces of the parts to be welded be essentially parallel to one another.

One of the parts can have interrupted welding joints, for instance as in closing discs on pump impellers.

The parts to be welded are gripped in the two adjacent jigs or jaws in such a way that they are forced to follow the motions of the jaws i.e., without any movement relative to the jaws. Both the jaws are preferably then subjected to the small angular vibrations while the thrust load is applied. Each jaw can be devised to hold one or more parts.

Although the means of vibration of the pieces has been illustrated in the drawings as mechanical means, electrical means of vibration produced by alternating current could also be used. Moreover, linear vibrations could be used in place of the angular vibrations set up by the apparatus illustrated in the drawings. For example, in FIGS. 3, 4 and 5, jaws 3 and 3' can be replaced by other jaws which move parallel relative to each other and which have an arm which rides in yoke 20 via pin 19 and corresponding parts, the jaws being positioned to either side and transverse to rocker 17 and thus made to move in a reciprocal motion relative to one another, all other apparatus parts being the same. Other methods for providing linear vibrations are possible using the apparatus of the invention.

What I claim is:

1. A method of friction welding two thermoplastic resin parts together in predetermined alignment with each other which comprises oscillating the two parts relative to one another through a displacement of small amplitude, thereby setting up a relative vibration between the two parts whereby opposing forces are substantially equal while pressing the two parts into surface contact with each other for a time sufficient to melt the contacting surfaces by frictionally induced heat, stopping the relative vibration with the parts in predetermined alignment, and holding the parts in predetermined alignment with said surfaces pressed into contact with each other until the melted thermoplastic resin hardens.

2. The method of claim 1 in which the vibration is an angular displacement.

3. The method of claim 1 in which the vibration is a linear displacement.

4. A method of friction welding two thermoplastic resin parts together in predetermined alignment with each other which comprises oscillating the two parts relative to one another through a displacement of small amplitude, thereby setting up a relative vibration between the two parts whereby opposing forces are substantially equal while pressing the two parts into surface contact with each other for a time sufficient to melt the contacting surfaces by frictionally induced heat, the vibration having a frequency of about 100 cycles/second and the vibrations being such as to produce a relative movement between the contacting surfaces of between 2 and 8 millimeters during each half cycle of vibration, stopping the relative vibration with parts in predetermined alignment, and holding the parts in predetermined alignment with said surfaces pressed into contact with each other until the melted thermoplastic resin hardens.

5. Apparatus for friction welding thermoplastic resin parts, which comprises a pair of jaws for holding the parts to be welded, means for urging the jaws toward one another to press the parts into surface contact with one another, means for vibrating both jaws holding said parts relative to one another through a displacement of small amplitude and in a plane parallel to the surfaces of said parts, and means for stopping the relative vibration with the parts in predetermined alignment.

6. The apparatus of claim 5 in which the two jaws are co-axially mounted for angular oscillation about a common axis.

7. The apparatus of claim 6 in which the two jaws are each provided with a radially extending arm, the two arms being caused to oscillate by two cams disposed out-of-phase on a common shaft parallel to said common axis.

8. The apparatus of claim 7 wherein said arm has associated therewith a second cam of larger throw than the first cams which produce the oscillation so that the arms can be pivoted to a position in which the first cams do not act thereon.

9. Apparatus for friction welding thermoplastic resin parts, which comprises a pair of jaws for holding the parts to be welded, means for urging the jaws toward one another to press the parts into surface contact with one another, the two jaws being co-axially mounted for angular oscillation about a common axis and each jaw provided with a radially extending arm, the arms being articulated to rocker arms pivotable about a further axis parallel to said common axis, said rocker arms being caused to oscillate by two cams disposed out-of-phase on a common shaft parallel to said common axis, means for vibrating both jaws holding said parts relative to one another through a displacement of small amplitude and in a plane parallel to the surfaces of said parts, and means for stopping the relative vibration with the parts in predetermined alignment.

10. The apparatus of claim 9 in which each cam has associated therewith a lever having a slidable, pivotal connection with the rocker arm, the levers being caused by the cams to reciprocate generally longitudinally of themselves and traverse to the rocker arms in a working position, the levers, together with the cam shaft, being rotatable to a position wherein they are aligned with the rocker arms, so that reciprocation of the lever causes no oscillation of the rocker arm and thus no movement of the jaws.

11. The apparatus of claim 5 in which the two jaws are moved reciprocally in a plane parallel to the surfaces of said parts.

12. The apparatus of claim 11 in which the two jaws are each provided with an extended arm, the arms being articulated to rocker arms pivotable about an axis, said rocker arms being caused to oscillate by two cams disposed out-of-phase on a common shaft parallel to said axis, said jaw and extended arm being positioned transverse to the rocker arm.

13. Apparatus for friction welding thermoplastic resin parts, which comprises a pair of jaws for holding the parts to be welded, means for urging the jaws toward one another to press the parts into surface contact with one another, the two jaws each being provided with an extended arm, the arms being articulated to rocker arms pivotable about an axis, said rocker arms being caused to oscillate by two cams disposed out-of-phase on a common shaft parallel to said axis, said jaw and extended arm being positioned transverse to the rocker arm, each cam having associated therewith a lever having a slidable, pivotal connection with the rocker arm, the levers being caused by the cams to reciprocate generally longitudinally of themselves and traverse to the rocker arms in a working position, the levers, together with the cam shaft, being rotatable to a position wherein they are aligned with the rocker arms, so that reciprocation of the lever causes no oscillation of the rocker arm and thus no movement of the jaws, means for vibrating both jaws holding said parts relative to one another through a displacement of small amplitude and reciprocally in a plane parallel to the surfaces of said parts, and means for stopping the relative vibration with the parts in predetermined alignment.

* * * * *

PO-1050
(5/69)

UNITED STATES PATENT OFFICE
CERTIFICATE OF CORRECTION

Patent No. 3,860,468    Dated January 14, 1975

Inventor(s) Richard A. Scherer

It is certified that error appears in the above-identified patent and that said Letters Patent are hereby corrected as shown below:

Column 6, line 3, Claim 8, "said" should be -- each --.

Signed and sealed this 1st day of April 1975.

(SEAL)
Attest:

RUTH C. MASON
Attesting Officer

C. MARSHALL DANN
Commissioner of Patents
and Trademarks